United States Patent
Koerner et al.

(10) Patent No.: US 11,502,585 B2
(45) Date of Patent: Nov. 15, 2022

(54) METHOD FOR PRODUCING A SQUIRREL-CAGE ROTOR

(71) Applicant: SIEMENS MOBILITY GMBH, Munich (DE)

(72) Inventors: Olaf Koerner, Nuremberg (DE); Freerk Jacobus Oude Kotte, Stein (DE)

(73) Assignee: Siemens Mobility GmbH, Munich (DE)

( * ) Notice: Subject to any disclaimer, the term of this patent is extended or adjusted under 35 U.S.C. 154(b) by 20 days.

(21) Appl. No.: 16/980,511

(22) PCT Filed: Feb. 5, 2019

(86) PCT No.: PCT/EP2019/052705
§ 371 (c)(1),
(2) Date: Sep. 14, 2020

(87) PCT Pub. No.: WO2019/174816
PCT Pub. Date: Sep. 19, 2019

(65) Prior Publication Data
US 2021/0028675 A1     Jan. 28, 2021

(30) Foreign Application Priority Data
Mar. 12, 2018   (EP) .................................... 18161163

(51) Int. Cl.
*H02K 15/00*      (2006.01)
*H02K 17/16*      (2006.01)

(52) U.S. Cl.
CPC ....... *H02K 15/0012* (2013.01); *H02K 17/165* (2013.01)

(58) Field of Classification Search
CPC .................... H02K 15/0012; H02K 17/165
(Continued)

(56) References Cited

U.S. PATENT DOCUMENTS

| 8,946,969 B2 | 2/2015 | Doelz |
| 2006/0066157 A1* | 3/2006 | Narayanan ......... H02K 15/0012 310/54 |

(Continued)

FOREIGN PATENT DOCUMENTS

| DE | 3022397 A1 * | 1/1981 | ............... H02K 1/20 |
| DE | 3834466 C1 | 11/1989 | |

(Continued)

OTHER PUBLICATIONS

Machine Translation of DE 3022397 A1 (Year: 1981).*
Machine Translation of EP 2592729 A1 (Year: 2013).*
Machine Translation of EP 2782222 A2 (Year: 2014).*

*Primary Examiner* — Quyen P Leung
*Assistant Examiner* — Minki Chang
(74) *Attorney, Agent, or Firm* — Laurence Greenberg; Werner Stemer; Ralph Locher

(57) ABSTRACT

A method for producing a squirrel-cage rotor of an asynchronous machine includes the following steps: providing a main body, which is magnetically conductive at least in parts and has substantially axially extending grooves; inserting electrical conductors into the grooves in such a way that the conductors protrude from the axial ends of the magnetically conductive main body; positioning electrically conductive end rings, which have a plurality of openings for receiving the respective conductors; and establishing electrical contact between the conductors and the end rings by way of one or more additive manufacturing processes.

6 Claims, 3 Drawing Sheets

(58) Field of Classification Search
USPC .................................... 310/125, 156.78, 211
See application file for complete search history.

(56) References Cited

U.S. PATENT DOCUMENTS

| | | |
|---|---|---|
| 2012/0248901 A1 | 10/2012 | Maeda et al. |
| 2014/0285058 A1 | 9/2014 | Thumm et al. |
| 2015/0188397 A1 | 7/2015 | Kim |
| 2018/0278106 A1* | 9/2018 | Moriya .................... H02K 1/26 |
| 2019/0149027 A1* | 5/2019 | Thumm ............. H02K 15/0012 |
| | | 310/211 |
| 2020/0336056 A1* | 10/2020 | Chen .................... H02K 17/165 |

FOREIGN PATENT DOCUMENTS

| | | | | |
|---|---|---|---|---|
| EP | 1643622 | A2 | 4/2006 | |
| EP | 2592729 | A1 * | 5/2013 | ......... H02K 15/0012 |
| EP | 2592729 | A1 | 5/2013 | |
| EP | 2782222 | A2 * | 9/2014 | ......... H02K 15/0012 |
| EP | 2782222 | A2 | 9/2014 | |

* cited by examiner

METHOD FOR PRODUCING A SQUIRREL-CAGE ROTOR

BACKGROUND OF THE INVENTION

Field of the Invention

The invention relates to a method for producing a squirrel-cage rotor of an asynchronous machine, to a squirrel-cage rotor and also to an asynchronous machine with such a squirrel-cage rotor.

A squirrel-cage rotor of an asynchronous machine has a short-circuit cage which is embedded in a magnetically conductive main body. In this configuration the conductors arranged in the magnetically conductive main body are electrically connected by an end ring, which can be arranged directly on the end faces or at a distance therefrom, to the axial end faces of the magnetically conductive main body, which can also be designed as a laminated core.

A short-circuit rotor of an electric machine is known from DE 38 34 466 C1, in which the ends of the conductors projecting from the grooves at the two end faces of the laminated rotor core project into an annular depression of an end ring delimited by an inner and outer gap and are connected electrically and mechanically to the end ring by hard solder introduced into the ring depression made to melt by heating up the complete end ring for a time and hardened thereafter.

The disadvantage of this arrangement is that with this type of connection by means of hard soldering methods solder gaps have to be maintained however, which can only be produced in a process0reliable manner with some effort.

SUMMARY OF THE INVENTION

Using this as its starting point, the underlying object of the invention is to create a squirrel-cage rotor of an asynchronous machine that can be produced in a simple and reliable manner. Inter alia this process is intended to improve the establishing of electrical contact between conductors and an end ring. Furthermore an asynchronous machine is to be provided that exhibits comparatively small losses.

The desired object is successfully achieved by a method for producing a squirrel-cage rotor of an asynchronous machine by way of the following steps:
Provision of a main body, which is magnetically conductive at least in parts and has grooves extending substantially axially,
Insertion of electrical conductors into the grooves in such a way that said conductors protrude from the axial end faces of the magnetically conductive body,
Positioning of electrically conductive end rings, which have a plurality of openings for receiving the respective conductors,
Establishing electrical contact between the conductors and the rings by means of one or more additive manufacturing (AM) processes.

The desired object is likewise successfully achieved by a squirrel-cage rotor, which has been produced by the steps listed above.

The desired object is likewise successfully achieved by an asynchronous machine with an inventive squirrel-cage rotor.

Through the inventive production of a squirrel-cage rotor of an asynchronous machine, the way in which contact was previously established between conductors and end rings by means of a soldering process is now greatly simplified, with contact being established in an improved manner.

Through the inventive embodiment of the end ring with through-holes substantially adapted to the bar geometry, the opening in the direction of the end face of the magnetically conductive main body offers a type of sealing so to speak by virtue of only a small gap dimension remaining. Thus in an in particular axially performed additive manufacturing method, for example a cold-spray method, a seal in the direction of the magnetically conductive main body is guaranteed.

The openings in the end ring can be provided for example by milling, punching, forging or laser cutting or also by casting a prefabricated end ring.

The cutouts in the end ring are filled by contact being established with a conductive material, preferably copper or also aluminum. Electrical contact is thus established between the section of the conductor in the area of the end ring and the end ring. The cutouts in the end ring open out axially in this case towards the outside, i.e. away from the magnetically conductive main body. In this case these cutouts are now cone-shaped or funnel-shaped for example.

The conductors, in particular individual conductor bars or conductor bar bundles per groove in such cases, can either ultimately be terminated axially to be flush with the outer end faces of the end ring or be axially taken further, namely axially beyond the end face of the end ring in order in this way to be able to achieve a certain ventilation effect during the operation of the asynchronous machine.

In a subtractive, e.g. a metal cutting, processing of the end ring, in particular to form the depression, a milling tool does not have to form a depression adjoining each cutout, but can form a depression adjoining two or more cutouts. This enables production to be speeded up.

Advantageously the end ring and the conductor bars are assembled and during and/or after assembly a sealing medium is employed to seal any gaps between end ring and cage bar.

In an advantageous form of embodiment of the invention, the additive method is an additive arc welding method and a metal powder application (MPA) method or a 3D metal printing (3DMP) method.

However other additive manufacturing methods known per se are suitable, such as the cold-spray method.

The additive method offers the advantage that a material-to-material connection with simultaneous deposition of material is achieved. This material-to-material connection is especially suitable in respect of the required electrical and mechanical properties, such as electrical conductivity and resistance to centrifugal forces.

The additive method offers the additional advantage of this method being embodied to run in a fully automated manner. This makes a more process-reliable method possible. In addition the additive method offers the advantage of in particular small batches and/or prototypes being able to be produced flexibly and quickly, even while taking account of changed geometries.

Advantageously the additive method is integrated into the production process for manufacturing the rotor of an asynchronous machine and thus of the electrical machine itself.

Additive arc welding refers to a welding method in which a volume is built up by an additional welding material, e.g. wire or powder, while applying heat. Here the additional welding material is applied layer-by-layer, connected to a component to be connected or to a layer beneath it in a material-to-material manner by welding and thus the building up of the volume is achieved.

Examples of methods that are based on a similar principle and therefore are likewise suitable are as follows: Laser application welding methods or plasma powder application welding methods, DMD (Direct Metal Deposition) methods, LMD (Laser Metal Deposition) methods and 3DMP (3D Metal Print) methods.

In the MPA method a main gas, preferably nitrogen, air, helium or water vapor, is accelerated in a Laval nozzle. Shortly before, in or after a Laval point, powder particles are injected. The powder particles are accelerated to beyond the speed of sound and in this condition strike a substrate or a component, such as e.g. a conductor bar and/or the end ring. The high kinetic energy of the powder particle is converted into energy during the collision. The adhesion can in addition or as an alternative also be produced by particles latching into one another or into the carrier.

Since the powder particles are not melted, only a small amount of energy is transferred into the component. In the MPA method a number of nozzles can apply different powder particles at the same time. Likewise the method can be operated with one nozzle and exchangeable powder containers. Thus a component can also be created that features at least two different materials.

The 3DMP method is based on the arc welding method and uses wire as a starting material. A workpiece is printed here weld bead by weld bead. The advantage of the 3DMP method is that many materials are already available as wire but not as powder however. Moreover wire as a material is better than material in powder form. The 3DMP method also offers a high rate of buildup.

In a further advantageous form of embodiment of the invention, the material is aluminum or copper or their alloys. The two materials aluminum and copper, in terms of price and conductivity, represent the best possible option for forming an electrically conductive connection.

The electrically conductive connection between end ring and cage bars is advantageously realized with a material that is already contained in the cage bars or of which the cage bars consist, preferably copper. This has the advantage that only slight adhesion forces are present and the connection can thereby be embodied to be resistant to mechanical stresses.

In a further version, each of the end rings can also be manufactured from a number of disks or sheets arranged axially directly behind one another, between which contact can also be made in the axial direction.

The ring lying axially closest to the laminated core advantageously has the narrowest through-holes for the conductor bars, in order thereby to obtain any sealing effect that may be required. This through-hole should enclose the conductor bar or the conductor bars as closely as possible, in order for the subsequent production steps, e.g. a substantially axial cold-spray method, to obtain an at least partial sealing in the direction of the laminated core. The further rings adjoining it in the axial direction then have cutouts, which appear as expanding pockets, in order to accept the conductive material, e.g. copper, inserted additively.

The further ring disks can have additional openings, cutouts, in order to establish a connection with the additively applied conductor material, e.g. copper of the conductor, to the ring disks and thus ultimately to the end ring, similar to buttonhole welding.

In a further embodiment, the bar ends of the conductors, for example by extra turning after positioning in the laminated core of the rotor, are provided with one or more slots running almost tangentially, in order to increase the effective surface for bar end to ring connection.

In a further embodiment, the conductors protruding axially from the axial end faces of the magnetically conductive main body are formed with an end stop shoulder for positioning the end rings. This has the advantage that the squirrel-cage rotor is produced with end rings spaced away from the magnetically conductive main body.

In an advantageous embodiment, the rotor is additionally balanced during the cold-spray method, so that in this way additional accumulations of material are obtained in or on the end ring, in order to obtain a balanced rotor.

This has the advantage that the production of the end ring by means of additive or subtractive production methods inter alia can be designed to be faster.

The invention, as well as further advantageous embodiments of the invention, will be explained in greater detail with reference to exemplary embodiments shown in principle. In the figures:

DETAILED DESCRIPTION OF THE INVENTION

Figure 1:
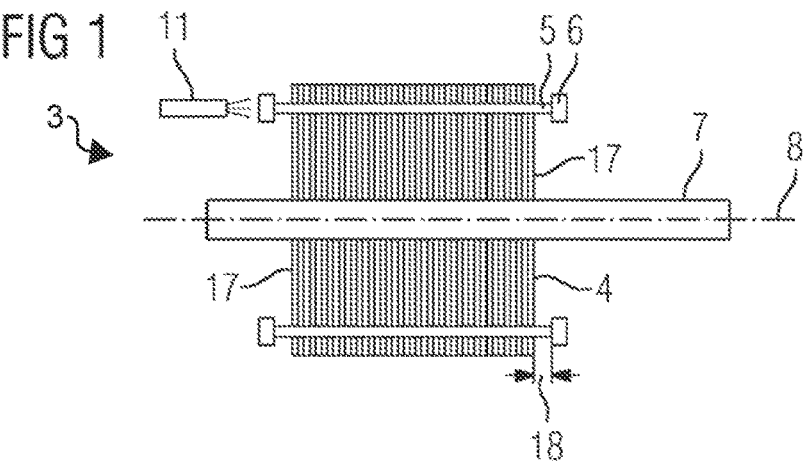
FIG. 1 shows a longitudinal section of a rotor.

FIG. 1 shows a rotor in a longitudinal section, especially a squirrel-cage rotor 3 of an asynchronous machine with its magnetically conductive main body, which is designed as a laminated core 4. Arranged in the laminated core in grooves running substantially axially are conductors 5, which protrude from the end faces 17 of the laminated core 4 and are connected electrically conductively there by end rings 6. The end rings 6 are at an axial distance 18 from the end face 17 of the laminated core 4, which improves the cooling of the squirrel-cage rotor 3, in particular in the area of the end rings 6. The laminated core 4 is connected in a torsion-proof manner to a shaft 7, which is supported rotatably about an axis 8.

Figure 2:
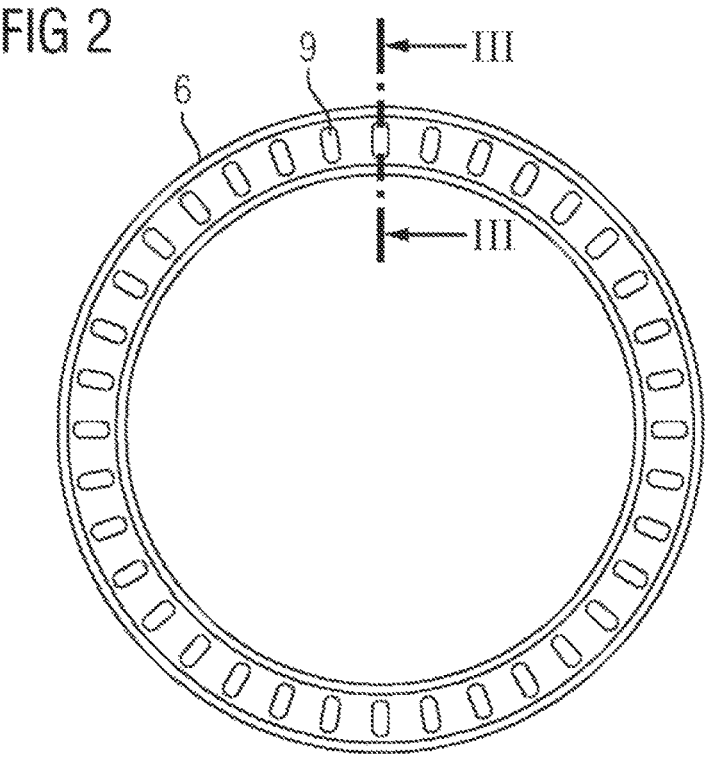
FIG. 2 shows a side view of an end ring at the cross-section indicated by the line III-III of FIG. 2.

FIG. 2 shows an end ring 6, which is available cast or milled for subsequent manufacturing, and which has openings 9 arranged in it, viewed in the circumferential direction, which correspond to the number and the shape of the conductors 5. In the manufacturing method the end ring 6 is now placed on the conductors protruding axially from the laminated core 4 and contact is established by an AM method, preferably a cold-spray method. In this method the required material is inserted in powder form axially into the area between conductor bar 5 in a cutout 10 of the end ring 6. This establishes contact between the conductor bars 5 and the end ring 6.

Figure 3:
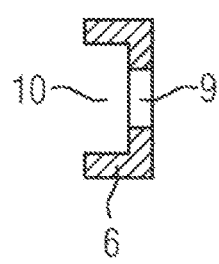
FIG. 3 shows a detailed diagram of said end ring.

FIG. 3 shows a detailed diagram of an opening 9, wherein it is made possible for the cold-spray method to establish a contact through the opening 9 in the end ring, which opens out into a cutout 10.

Figure 4:
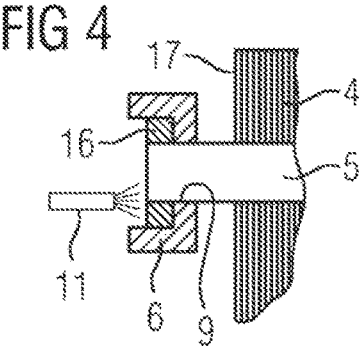
FIG. 4 shows the principle of an AM method.

FIG. 4 shows a conductor bar 5 placed in this opening 9, wherein copper is being spayed axially into the cutout 10 by a cold-spray nozzle 11, so that electrical contact is established between the conductor bar 5 and the end ring 6 by the application of material 16.

Figure 5:
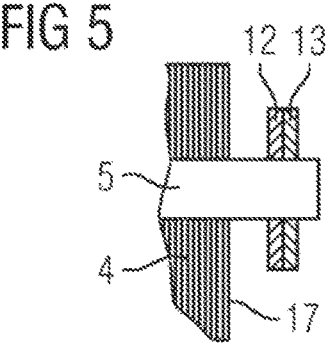
FIG. 5 shows a detailed diagram of an end ring.

FIG. 5 shows a laminated core 4 with an end ring 6, which is constructed from two ring disks 12 and 13 arranged axially behind one another, in a detailed diagram.

Figure 6:
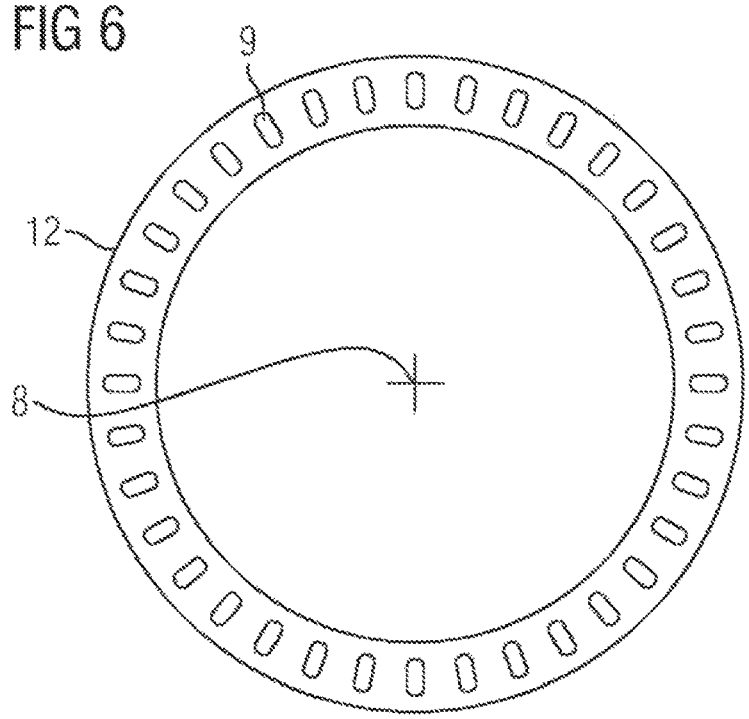
FIG. 6 shows a ring disk of said end ring.
Figure 8:
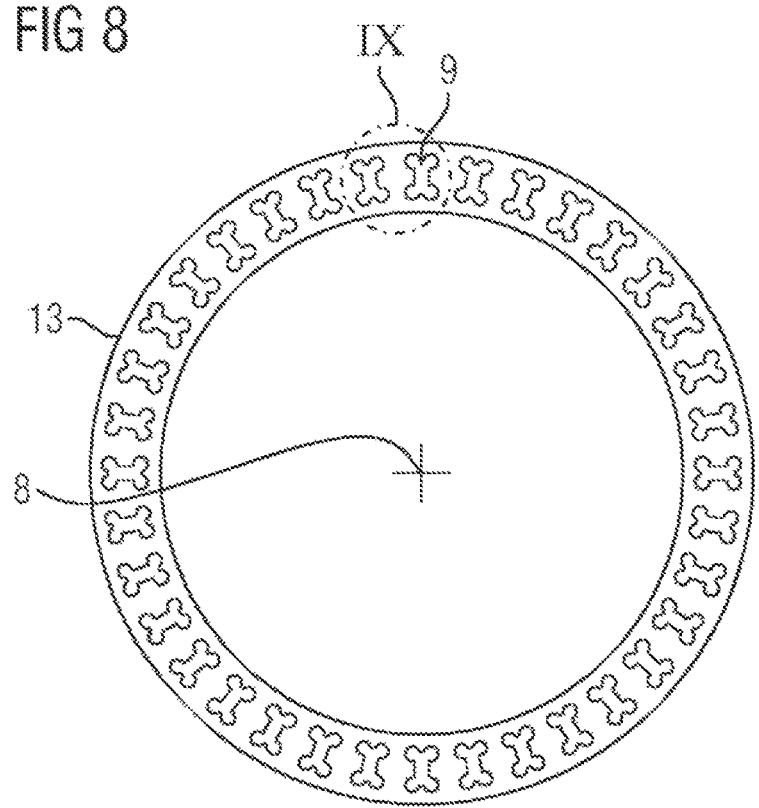
FIG. 8 shows a further disk.

Ring disk 12, as shown in FIG. 6, again has openings 9 in this case, which are adapted in their shape and size to the cross section of the conductor bar 5. Ring disk 13, as in FIG. 8, has the cutouts 10 which are embodied in their size and shape in such a way that they guarantee a comparatively good establishment of contact between the conductor bar 5 and the end ring 6, i.e. the ring disks 12 and 13.

Figure 7:
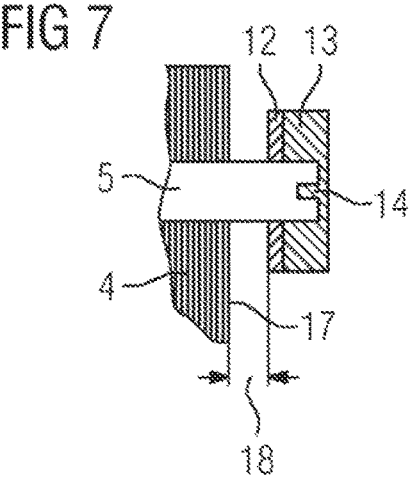
FIG. 7 shows a further detailed diagram of the end ring.

FIG. 7 shows an option for how, by tangential shaping of a conductor bar, the surface between end ring 6 and conductor bar 5 can be increased. This leads to better contact being established.

Figure 9:
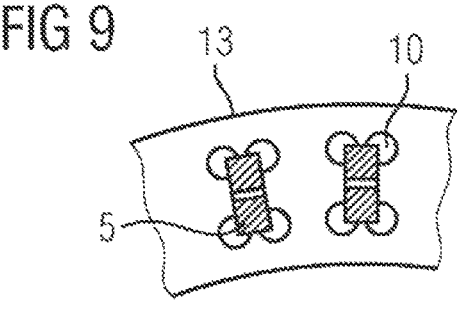
FIG. 9 shows a detailed diagram of a disk of the section indicated by the circle IX of FIG. 8,
FIGS. 10 and 11 show further detailed diagrams of a disk.

FIG. 9 shows bone-shaped, dumbbell-shaped or curved cutout 10 of the end ring 6, in particular of the ring disk 13, which fix a conductor bar 5 by means of how they are shaped by as few surface contacts as possible with the conductor bar in the end ring 6, in particular during the cold-spray method.

Figure 10:
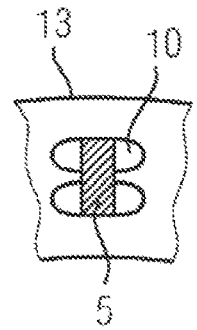

FIG. 10 shows a basically tailored cutout 10 for fixing the conductor bar 5, wherein likewise by the way in which the cutout 10 is shaped, as few surface contacts as possible that fix the conductor bar in the end ring 6 are present.

Figure 11:
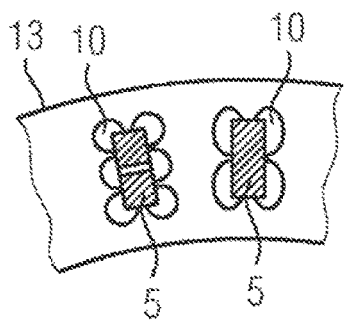

FIG. 11 shows further options for fixing the conductor bars 5 with as little contact surface as possible, in order to further improve the establishment of contact between the conductor bar 5 and the end ring 6, in particular the ring disk 13.

The embodiments of the cutouts 10 in accordance with FIG. 9, FIG. 10 and FIG. 11 are suitable above all for the rings 13. Ring disk 12 primarily also serves to seal the gap between conductor 5 and the opening 9 in ring disk 12 to the end face 17 of the laminated core 4.

The invention claimed is:

1. A method of producing a squirrel-cage rotor of an asynchronous machine, the method comprising:
   providing a main body, which is magnetically conductive, at least in parts thereof, which has axial end faces, and which is formed with grooves that extend substantially in an axial direction;
   inserting electrical conductors into the grooves such that the conductors project from the axial end faces of the magnetically conductive main body;
   providing electrically conductive end rings, which are formed with a plurality of openings for receiving the respective conductors;
   each of the end rings being a ring being produced from of a plurality of ring disks or metal sheets arranged directly behind one another;
   positioning one or more of the end rings at each axial end face of the magnetically conductive main body;
   wherein a ring disk lying axially closest to the magnetic main body has a narrowest through-hole for the conductors, and a further ring disk adjoins the ring disk in the axial direction, said further ring disk having cutouts; and
   establishing electrical contact between the conductors and end rings by an additive manufacturing process, the additive manufacturing process being a cold spray process in which conductive material is introduced substantially axially into the cutout, as a result of which the conductors are contacted with the end rings.

2. The method for producing a squirrel-cage rotor according to claim 1, wherein the conductors protrude axially from the axial end faces of the magnetically conductive main body, and the end rings are positioned so that a squirrel-cage rotor is produced with end rings spaced away from the magnetically conductive main body.

3. The method for producing a squirrel-cage rotor according to claim 1, which comprises establishing electrical contact and also a balancing by accumulations of material at and/or on the end ring through the additive manufacturing process.

4. The method for producing a squirrel-cage rotor according to claim 1, wherein the openings in the end rings open out in the axial direction starting from the end faces of the magnetically conductive main body.

5. A squirrel-cage rotor produced by the method according to claim 1, the squirrel-cage rotor comprising:
   a main body, which is magnetically conductive, at least in parts thereof, which has axial end faces, and which is formed with grooves that extend substantially in an axial direction;
   electrical conductors inserted into said grooves and projecting from said axial end faces of said magnetically conductive main body;
   electrically conductive end rings formed with openings for receiving respective said conductors;
   each of said end rings being a ring consisting of a plurality of disks or metal sheets arranged directly behind one another;
   wherein one or more of said end rings are disposed at each end face of said magnetically conductive main body, and wherein the respective ring lying axially closest to said magnetic main body has a narrowest through-hole for said conductor; and
   said conductors and said end rings being electrically contacted by material deposited by at least one additive manufacturing process.

6. An asynchronous machine, comprising a squirrel-cage rotor according to claim 5.

* * * * *